United States Patent [19]

Aldag, Jr. et al.

[11] Patent Number: 4,652,546

[45] Date of Patent: Mar. 24, 1987

[54] HYDROGEL DERIVED CATALYST OF ZINC TITANATE AND ALUMINA PROMOTED WITH COBALT AND MOLYBDENUM FOR HYDRODESULFURIZATION OR HYDRODENITROGENATION

[75] Inventors: Arthur W. Aldag, Jr.; Lloyd E. Gardner, both of Bartlesville, Okla.

[73] Assignee: Phillips Petroleum Company, Bartlesville, Okla.

[21] Appl. No.: 699,290

[22] Filed: Feb. 7, 1985

Related U.S. Application Data

[62] Division of Ser. No. 644,883, Aug. 27, 1984, Pat. No. 4,522,709.

[51] Int. Cl.$^4$ .................. B01J 21/04; B01J 21/06; B01J 23/80; B01J 23/88

[52] U.S. Cl. .................................................. 502/307
[58] Field of Search ............................. 502/307, 342

[56] References Cited

U.S. PATENT DOCUMENTS

| | | | |
|---|---|---|---|
| 4,287,050 | 9/1981 | Eastman et al. | 208/215 |
| 4,446,013 | 5/1984 | Aldag et al. | 208/135 |

Primary Examiner—W. J. Shine
Attorney, Agent, or Firm—French and Doescher

[57] ABSTRACT

The catalytic hydrodesulfurization and/or hydrodenitrogenation of an organic sulfur compound and/or an organic nitrogen compound is carried out in the presence of a hydrogel derived catalyst comprising zinc titanate and alumina promoted with cobalt and molybdenum.

9 Claims, No Drawings

HYDROGEL DERIVED CATALYST OF ZINC TITANATE AND ALUMINA PROMOTED WITH COBALT AND MOLYBDENUM FOR HYDRODESULFURIZATION OR HYDRODENITROGENATION

This application is a division of application Ser. No. 644,883, filed Aug. 27, 1984, now U.S. Pat. No. 4,522,709.

This invention relates to an improved catalytic process for the hydrosulfurization (HDS) of organic sulfur compounds and/or the hydrodenitrogenation (HDN) of organic nitrogen compounds.

Hydrodesulfurization is a process intended primarily to convert the sulfur in organic sulfur compounds to hydrogen sulfide. Hydrodenitrogenation is a process intended primarily to convert the nitrogen in organic nitrogen compounds to ammonia. Hydrodesulfurization and hydrodenitrogenation will generally occur at the same time under similar process conditions if both organic sulfur compounds and organic nitrogen compounds are present in the feed stream. The hydrogen sulfide and/or ammonia can be removed from the feed stream after the hydrodesulfurization and/or hydrodenitrogenation process. Hydrodesulfurization and hydrodenitrogenation are processes which are typically utilized to remove sulfur and nitrogen from a hydrocarbon-containing feedstock which also contains organic sulfur compounds and/or organic nitrogen compounds to produce fuels which, when burned, will meet environmental standards. The processes may be applied to feed streams other than hydrocarbon-containing feeds if organic sulfur compounds and/or organic nitrogen compounds are present and the removal of sulfur and/or nitrogen is desired.

The earliest hydrosulfurization and/or hydrodenitrogenation catalysts were bauxite and Fuller's earth. Later, catalysts containing cobalt molybdate on alumina and nickel tungstate on alumina substantially replaced the earlier catalyst and these catalysts are still used very extensively.

U.S. Pat. No. 4,287,050 discloses that a catalyst composition comprising catalytic grade alumina, zinc titanate, cobalt and molybdenum is effective as a hydrodesulfurization and/or hydrodenitrogenation catalyst. However, while the catalyst disclosed by U.S. Pat. No. 4,287,050 is an excellent catalyst, it is always desirable to improve the activity of a catalyst. It is thus an object of this invention to provide an improved catalytic process for the hydrodesulfurization of organic sulfur compounds and/or the hydrodenitrogenation of organic nitrogen compounds using the components of the catalyst of U.S. Pat. No. 4,287,050.

In accordance with the present invention, a hydrogel derived catalyst comprising zinc titanate and alumina promoted with cobalt and molybdenum is utilized as a catalyst in a hydrodesulfurization and/or hydrodenitrogenation process. The hydrodesulfurization and/or hydrodenitrogenation process is carried out under suitable conditions. The promoted hydrogel derived catalyst exhibits a substantially improved activity with respect to the promoted zinc titanate catalyst of U.S. Pat. No. 4,287,050.

The hydrodesulfurization and/or hydrodenitrogenation process is preferably carried out in cycles consisting of a reaction period and a regeneration period for the catalyst. The reaction period comprises contacting a feedstock which contains organic sulfur compounds and/or organic nitrogen compounds with the catalyst to thereby convert the sulfur in organic sulfur compounds in the feedstock to hydrogen sulfide and also convert the nitrogen in organic nitrogen compounds to ammonia. After the reaction period, an oxygen-containing gas is passed in contact with the catalyst to regenerate the catalyst by burning off carbonaceous materials which may have formed on the catalyst.

Other objects and advantages of the invention will be apparent from the foregoing brief description of the invention and the appended claims, as well as the detailed description of the invention which follows.

Any suitable organic sulfur compound may be hydrodesulfurized in accordance with the present invention. Suitable organic sulfur compounds include sulfides, disulfides, mercaptans, thiophenes, benzothiophenes, dibenzothiophenes and the like and mixtures of two or more thereof.

Any suitable organic nitrogen compound may be hydrodenitrogenized in accordance with the present invention. Suitable organic nitrogen compounds include amines, diamines, pyridines, quinolines, porphyrines, benzoquinolines and the like and mixtures of two or more thereof.

Organic sulfur compounds and/or organic nitrogen compounds contained in any suitable fluid stream may be hydrodesulfurized and/or hydrodenitrogenized in accordance with the present invention. Suitable fluid streams include light hydrocarbons such as methane, ethane, ethylene and natural gas, gases such as hydrogen and nitrogen, gaseous oxides of carbon, steam, and the inert gases such as helium and argon.

The invention is particularly directed to hydrocarbon-containing feed streams which also contain organic sulfur compounds and/or organic nitrogen compounds. Suitable hydrocarbon-containing feeds include not only those hydrocarbon containing feeds previously mentioned but also petroleum products and products from extraction and/or liquefaction of coal and lignite products from tar sands, products from shale oil and similar products. Suitable hydrocarbons include naphtha, distillates, gas oil having a boiling range from about 205° to about 538° C., topped crude having a boiling range in excess of about 343° C. and residuum.

The catalyst employed in the process of the present invention is a hydrogel derived catalyst comprising zinc titanate and alumina promoted with cobalt and molybdenum. In general, the catalyst composition is prepared by first preparing zinc titanate which is then reduced to a small size. The resulting material is mixed with a hydrosol of a suitable acidic material. A suitable base is then added to the mixture to form a hydrogel. The resulting hydrogel is dried slowly and calcined to form a hydrogel of zinc titanate and alumina.

The cobalt and molybdenum promoters are then added to the hydrogel derived catalyst of zinc titanate and the alumina. The cobalt and molybdenum promoters may be added separately or in the form of cobalt molybdate.

The zinc titanate portion of the catalyst composition may be prepared by intimately mixing suitable portions of zinc oxide and titanium dioxide, preferably in a liquid such as water, and calcining the mixture in the presence of free oxygen at a temperaure in the range of about 650° C. to about 1050° C., preferably in the range of about 675° C. to about 975° C., to form zinc titanate. A calcining temperature in the range of about 800° C. to about 850° C. is most preferred because the surface area of the zinc titanate is maximized in this temperature range, thus producing a more active zinc titanate. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active zinc titanate. Preferably the titanium dioxide has an average particle size of less than 100 millimicrons and more preferably less than 30 millimicrons. Flame hydrolyzed titanium dioxide has extremely small particle size and is particularly preferred in preparing the zinc titanate. The atomic ratio of zinc to titanium can be any suitable ratio. The atomic ratio of zinc to titanium will generally lie in the range of from about 1:1 to about 3:1 and will preferably lie in the range of from about 1.8:1 to about 2.2:1 because the activity of the zinc titanate is greatest for atomic ratios of zinc to titanium in this range. The term "zinc titanate" is used regardless of the atomic ratio of zinc to titanium.

The zinc titanate portion of the catalyst composition may also be prepared by coprecipitation from aqueous solutions of a zinc compound and a titanium compound. The aqueous solutions are mixed together and the hydroxides are precipitated by the addition of ammonium hydroxide. The precipitate is then washed, dried and calcined, as described in the preceding paragraph, to form zinc titanate. This method of preparation is less preferred than the mixing method because the zinc titanate prepared by the coprecipitation method is softer than the zinc titanate prepared by the mixing method.

The resulting zinc titanate is reduced to a suitable size for mixing with a hydrosol alumina by any suitable method such as treatment in an ultrasonic disrupter. The zinc titanate may be reduced to any suitable size with a particle size in the range of about 1 to about 10 microns being preferred.

The resulting zinc titanate having a fine particle size is mixed with a hydrosol of alumina. Any suitable form of alumina may be utilized. Alumina hydrate is particularly preferred because a hydrosol of alumina hydrate is readily converted to a hydrogel and then to the oxide phase after calcination.

After the zinc titanate has been thoroughly mixed into the hydrosol, a suitable base is added to convert the hydrosol to a hydrogel. Any suitable base such as alkali metal hydroxides, ammonium hydroxide, or urea may be utilized. Ammonium hydroxide is the preferred base because it does not have any metallic component that would remain in the hydrogel.

The resulting hydrogel is dried slowly so that water will not be removed so rapidly that the hydrogel structure will collapse which would result in excessive loss of pore volume and surface area of the finished zinc titanate hydrogel. Any suitable drying time can be utilized which does not result in too rapid removal of water. Preferably, the drying time is in the range of about 8 hours to about 24 hours.

Any suitable temperature can be utilized for the drying of the zinc titanate hydrogel but again the temperature should be such that too rapid a removal of water does not result. The temperature is preferably in the range of about 35° C. to about 150° C. The most preferred drying condition is to start the drying process at about 80° C. and increase the temperature slowly to about 120° C. during the drying time.

After the zinc titanate hydrogel has been dried, the zinc titanate hydrogel derived catalyst is calcined in the presence of free oxygen. Any suitable free oxygen-containing gas may be utilized with air being preferred because of its availability. Also, any suitable time and temperature for the calcining may be utilized with a preferred time being about two hours and a preferred temperature being in the range of about 425° C. to about 650° C. and more preferably in the range of about 480° C. to about 600° C. Although the dried zinc titanate hydrogel can be placed directly into a preheated furnace or kiln for calcining, it is preferable for the catalyst to attain its final temperature during a heating period of about two hours.

The hydrogel derived catalyst of zinc titanate and alumina can contain any suitable weight percent of zinc titanate. In general, the amount of zinc titanate in the hydrogel derived catalyst of zinc titanate and alumina will be in the range of from about 10 weight percent to about 50 weight percent based on the total weight of the hydrogel of zinc titanate and alumina and will more preferably be in the range of from about 20 weight percent to about 40 weight percent based on the total weight of the hydrogel derived catalyst of zinc titanate and alumina.

Either the elemental form of the promoters or any suitable compounds of the promoters may be used to form the catalyst composition.

Cobalt compounds suitable for use as a promoter are cobalt acetate, cobalt carbonate, cobalt nitrate, cobalt oxide, cobalt sulfate, cobalt thiocyanate, and the like and mixtures of two or more thereof.

Molybdenum compounds suitable for use as a promoter are ammonium molybdate, potassium molybdate, molybdenum oxides such as molybdenum (IV) oxide and molybdenum (VI) oxide and the like and mixtures of two or more thereof.

The promoting elements can be added to the catalyst by any method known in the art. The cobalt, and molybdenum may be added individually by impregnating the hydrogel with a solution-aqueous or organic-that contains a promoting element. After the promoting element has been added to the hydrogel, the hydrogel is dried.

After drying to remove essentially all the solvent, a solution of another promoting element is added by impregnation if both the cobalt and molybdenum are not added in one step in the form of cobalt molybdate. The sequence in which the promoting elements are added is immaterial.

After the cobalt and molybdenum have been added, the catalyst composition is calcined in the presence of oxygen at a temperature in the range of about 500° to about 650° C. until volatile matter is removed and the promoting elements are substantially converted to their oxides. The time required for calcining step may range from about 0.1 to about 10 hours.

Any suitable atomic ratio of cobalt to molybdenum may be utilized. The atomic ratio of cobalt to molybdenum is generally in the range of from about 0.1:1 to about 3:1 and is more preferably in the range of from about 0.6:1 to about 0.7:1. In like manner, any suitable concentration of cobalt and molybdenum may be utilized. The cobalt and molybdenum will be present in the catalyst in the oxide form and the concentration of cobalt oxide plus molybdenum oxide will generally be in the range from about 2 to about 25 weight percent based on the the weight of the total catalyst composition and will more preferably be in the range of about 10 to about 20 weight percent based on the weight of the total catalyst composition.

The process of this invention can be carried out by means of any apparatus whereby there is achieved a contact with the catalyst of the organic compounds to be hydrodesulfurized and/or hydrodenitrogenized. The process is in no way limited to the use of a particular apparatus. The process of this invention can be carried out using a fixed catalyst bed, fluidized catalyst bed, or moving catalyst bed. Presently preferred is a fixed catalyst bed.

In order to avoid any casual and potentially hazardous mixing of the feed stream containing the organic sulfur compound and/or organic nitrogen compound and the oxygen-containing fluid utilized in the regeneration step, provision is preferably made for terminating the flow of feed to the reactor and injecting an inert purging fluid such as nitrogen, carbon dioxide or steam. Any suitable purge time can be utilized. The purge duration will be of sufficient length to completely remove hydrogen and hydrocarbons. Any suitable flow rate of the purge fluid may be utilized. Presently preferred is a purge fluid flow rate in the range of from about 800 GHSV to about 1200 GHSV.

Any suitable temperature for hydrodesulfurization and/or hydrodenitrogenation of the organic sulfur compounds and/or organic nitrogen compounds over the catalyst composition of the present invention can be utilized. The temperature will generally be in a range of from about 205° C. to about 538° C. and will more preferably be in the range of from about 316° C. to about 427° C. for the hydrodesulfurization process and/or the hydrodenitrogenation process.

Any suitable pressure for the hydrodesulfurization and/or hydrodenitrogenation of the organic sulfur compounds and/or organic nitrogen compounds over the catalyst composition of the present invention can be utilized. In general, the pressure will be in the range of from about 200 to about 3000 psig total system pressure for the process. The total system pressure is the sum of the partial pressure of the feedstock plus the partial pressure of the added hydrogen. Preferably the total system pressure will be in the range of from about 400 to about 1000 psig for the hydrodesulfurization process and/or the hydrodenitrogenation process.

To maintain the activity of the catalyst, the temperature of the hydrodesulfurization and/or hydrodenitrogenation process is gradually increased to compensate for loss of catalyst activity due to fouling of the catalyst. When the temperature of the hydrodesulfurization and/or hydrodenitrogenation process cannot conveniently be increased further, the catalyst is typically regenerated by terminating the flow of feed to the reactor and purging with an inert fluid such as nitrogen to remove combustibles and then introducing free oxygen-containing fluid to oxidize the carbonaceous deposits which have formed on the catalyst during the hydrodesulfurization and/or hydrodenitrogenation process. The catalyst will generally be utilized for a year or longer before being regenerated.

The amount of oxygen, from any source, supplied during the regeneration step will be in an amount sufficient to remove carbonaceous materials from the catalyst. The regeneration step is conducted at generally the same pressure recited for the hydrodesulfurization and/or hydrodenitrogenation step. The temperature for the regeneration step is preferably maintained in the range of from about 425° C. to about 650° C. If the hydrodesulfurization and/or hydrodenitrogenation process has been proceeding at a temperature lower than 425° C., the temperature of the catalyst should be increased to about 425° C. prior to the start of the regeneration of the catalyst in order to remove any carbonaceous deposits on the catalyst within a reasonable time. After regeneration is complete the pre-sulfiding procedure is repeated for optimum catalyst activity.

The following examples are presented in further illustration of the invention.

EXAMPLE 1

Catalyst Preparation

Catalyst 1

A control catalyst was prepared according to the procedure set forth in Example 6 of U.S. Pat. No. 4,287,050 by United Catalysts, Inc., Louisville, Ky. Characteristics of the catalyst were as follows:

Surface Area 181 m$^2$/g

Concentration of Components (weight percent based on weight of total catalyst composition)

$Zn_2Ti\ O_4$—6.74 wt %

CoO—5.09 wt %

$MoO_3$—14.19 wt %

Catalyst 2

Zinc titanate was prepared in the same manner as the zinc titanate used in the preparation of Catalyst 1. Then 27 grams of the thus prepared zinc titanate was slurried in 500 mL of water. The resulting slurry was then treated with the transducer of an ultrasonic disrupter at high power for ten minutes to reduce the particle size of the zinc titanate to a size in the range of about 2 to about 10 microns. The resulting slurry containing the reduced particle-size zinc titanate was then combined with a suspension of 243 grams of alpha-alumina monohydrate and 900 mL of water. Sufficient nitric acid was added to the resulting mixture to lower the pH of the resulting mixture from 7.0 to 3.0 to produce a hydrosol. Then 15 mL of concentrated ammonium hydroxide was added to the hydrosol to produce a hydrogel. The hydrogel was then dried in an oven for 21 hrs. at 82° C. The thus-dried hydrogel was then calcined in air in a furnace which was heated to 649° C. during 2 hours and then held at that temperature for 2 hours. The resulting zinc titanate hydrogel was crushed and screened.

Then 15.3 g of the resulting hydrogel was soaked in a solution of 15.3 g $(NH_4)_6Mo_7O_{24}4H_2O$ dissolved in 100 mL water. After excess solution was drained away, the impregnated hydrogel was dried under a heat lamp. The dried material was then calcined in a furnace heated to 538° C. for two hours.

The resulting molybdenum-impregnated zinc titanate hydrogel derived catalyst was then soaked in a solution of 18.5 g $Co(NO_3)_2.6H_2O$ dissolved in 100 mL of water. After excess solution was drained away and the impregnated hydrogel was dried under a heat lamp. The dried material was then calcined at 538° C. for two hours. Characteristics of the catalyst were as follows:

Surface Area 221 m$^2$/g

Concentration of Components (weight percent based on weight of total catalyst composition)

$Zn_2Ti\ O_4$—8.90 wt %

CoO—3.24 wt %

$MoO_3$—12.50 wt %

Catalyst 3

Following the same general procedure as for Catalyst 2, another preparation was made to be even closer to Catalyst 1 in Co/Mo composition for comparative purposes. Characteristics of the catalyst were as follows:
Surface area 216 m²/g
Concentration of Components (weight percent based on weight of total catalyst composition)
$Zn_2TiO_4$—9.55 wt %
  CoO—4.91 wt %
  $MoO_3$—15.7 wt %

EXAMPLE II

Catalysts 1, 2, and 3 were used to hydrodesulfurize and hydrodenitrogenate a light cycle oil (boiling range 350°–690° F.) that contained 2.25 wt % organic sulfur (from added dibenzothiophene) and 166 ppm (by weight) organic nitrogen. The API gravity of the oil was 23.1.

Runs were made in an automated test unit capable of testing six catalysts simultaneously. Six reactors 1″ o.d.×0.813″ i.d.×4.5″ in length and made of 316 stainless steel were disposed symmetrically in a single furnace. The reactors operated with a fixed catalyst bed in down-flow mode. Feedstock preheat lines ran upflow through the furnace, entering the tops of the reactors where the feedstock was mixed with added hydrogen. Conditions in the reactors were mixed phase, i.e. trickle bed process. Runs were made with 5 cc of catalyst plus 20 cc of inert diluent (alundum). Contact time of feedstock with catalyst, in terms of volume of feedstock per volume of catalyst per hour (LHSV), was 5 LHSV.

All runs were made at 5.0 LHSV, 500 psig, with 5000 SCF hydrogen/bbl feed. All catalysts were presulfided first at 204° C. until hydrogen sulfide was detected in the effluent flowing from the reactor, then at 372° C. until hydrogen sulfide was detected in the effluent flowing from the reactor. Results of the runs are set forth in Table I.

TABLE I

| Temp, °F. | Catalyst: 1 | 2 | 3 |
|---|---|---|---|
| Wt % Sulfur in Product | | | |
| 525 | — | — | .93 |
| 550 | .98 | .94 | .75 |
| 600 | .51 | .45 | .19 |
| 650 | .099 | .070 | 0.24 |
| 700 | .026 | .020 | .010 |
| 750 | .013 | .017 | .0072 |
| (Sulfur in Feed = 2.25 wt %) | | | |
| PPM Nitrogen in Product | | | |
| 525 | — | — | 52 |
| 550 | 57 | 51 | 41 |
| 600 | 50 | 45 | 38 |
| 650 | 40 | 32 | 16 |
| 700 | 33 | 25 | 15 |
| 750 | 24 | 21 | 13 |
| (Nitrogen in Feed = PPM) | | | |

The results shown in Table I indicate significantly more sulfur and nitrogen are removed from the feed by Catalysts 2 and 3, the inventive catalysts.

While the wt % S in product of catalyst 2 is 0.004 higher than the control catalyst at 750° F., the overall performance of both inventive catalysts is superior to Catalyst 1.

EXAMPLE 3

It is believed that the increase in surface area of Catalyst 2 and 3 with respect to Catalyst 1 (40 m²/g in the case of catalyst 2 and 35 m²/g in the case of catalyst 3) is at least partially responsible for the improved performance of the hydrogel derived catalyst of zinc titanate and alumina promoted with cobalt and molybdenum. One factor which affects the surface area is the size of the zinc titanate used in the preparations of Catalyst 2 and 3 as opposed to the preparation in Catalyst 1. The size of the zinc titanate used in the preparation of Catalyst 1 was about 75 microns (200 mesh) as opposed to the size in the range of about 2 to about 10 microns for the zinc titanate of Catalyst 2 and 3. However, calculations based on standard equations for particle size show that the size reduction of the zinc titanate should result in an increase in surface area of about 0.5 m²/g which is far smaller than the increased surface area of between 35 and 40 m²/g which was actually demonstrated.

Reasonable variations and modifications are possible within the scope of the disclosure and the appended claims to the invention.

That which is claimed is:

1. A hydrogel derived catalyst composition comprising zinc titanate and alumina promoted with cobalt and molybdenum.

2. A composition in accordance with claim 1 wherein said hydrogel derived catalyst comprising zinc titanate and alumina promoted with cobalt and molybdenum is prepared by calcining a mixture of zinc oxide and titanium dioxide in the presence of free oxygen at a temperature in the range of about 650° C. to about 1050° C. to form zinc titanate, mixing the thus formed zinc titanate in a powdered form with a hydrosol of alumina hydrate to form a zinc titanate/alumina hydrosol, adding ammonium hydroxide to convert said hydrosol to a hydrogel, drying and calcining said hydrogel to form a hydrogel derived catalyst comprising zinc titanate and alumina, adding a solution or solutions of cobalt and molybdenum compounds to said hydrogel derived catalyst comprising zinc titanate and alumina and calcining said hydrogel derived catalyst comprising zinc titanate and alumina to which cobalt and molybdenum have been added, wherein said cobalt and molybdenum are present in said catalyst composition in the oxide form after the final calcining step.

3. A process in accordance wth claim 2 wherein the concentration of zinc titanate in said hydrogel derived catalyst comprising zinc titanate and alumina promoted with cobalt and molybdenum is in the range of about 10 to about 50 wt % based on the weight of only the hydrogel derived catalyst comprising zinc titanate and alumina and wherein the concentration of cobalt and molybdenum in said hydrogel derived catalyst comprising zinc titanate and alumina promoted with cobalt and molybdenum is in the range of about 2 to about 25 wt % based on the weight of the hydrogel derived catalyst comprising zinc titanate and alumina promoted with cobalt and molybdenum.

4. A process in accordance with claim 2 wherein the concentration of zinc titanate in said hydrogel derived catalyst comprising zinc titanate and alumina promited with cobalt and molybdenum is in the range of about 20 to about 40 wt % based on the weight of only the hydrogel derived catalyst comprising zinc titanate and alumina and wherein the concentration of cobalt and molybdenum in said hydrogel derived catalyst comprising zinc titanate and alumina promoted with cobalt and molybdenum is in the range of about 10 to about 20 wt % based on the weight of the hydrogel derived catalyst comprising zinc titanate and alumina promoted with cobalt and molybdenum.

5. A process in accordance with claim 2 wherein the atomic ratio of zinc to titanium in said hydrogel derived catalyst comprising zinc titanate and alumina promoted with cobalt and molybdenum is in the range of about 1:1 to about 3:1 and wherein the atomic range ratio of cobalt to molybdenum in said hydrogel of zinc titanate and alumina promoted with cobalt and molybdenum is in the range of about 0.1:1 to about 3:1.

6. A process in accordance with claim 2 wherein the atomic ratio of zinc to titanium in said hydrogel derived catalyst comprising zinc titanate and alumina promoted with cobalt and molybdenum is in the range of about 1.8:1 to about 2.2:1 and wherein the atomic range ratio of cobalt to molybdenum in said hydrogel of zinc titanate and alumina promoted with cobalt and molybdenum is in the range of about 0.6:1 to about 0.7:1.

7. A process in accordance with claim 2 wherein said hydrogel derived catalyst comprising zinc titanate and alumina is dried for a time in the range of about 8 to about 24 hours and at a temperature in the range of about 35° C. to about 150° C.

8. A process in accordance with claim 7 wherein the dried hydrogel derived catalyst comprising zinc titanate and alumina is calcined in the presence of free oxygen at a temperature in the range of about 425° C. to about 650° C. for a time of about 2 hours.

9. A process in accordance with claim 7 wherein said hydrogel derived catalyst comprising zinc titanate and alumina to which cobalt and molybdenum have been added is calcined in the presence of free oxygen at a temperature in the range of about 500° C. to about 650° C. for a time in the range of about 0.1 to about 10 hours.

* * * * *